US011170078B2

(12) United States Patent
Pogorelik et al.

(10) Patent No.: US 11,170,078 B2
(45) Date of Patent: Nov. 9, 2021

(54) DYNAMIC DATA WATERMARKING FOR LEAKAGE SOURCE DETECTION

(71) Applicant: Intel Corporation, Santa Clara, CA (US)

(72) Inventors: Oleg Pogorelik, Lapid JM (IL); Shefy Gur-Ary, Har-Gilo (IL); Adir Abraham, Haifa (IL); David Alhanati, Santa Clara, CA (US); Angelo Moscati, Jerusalem (IL); Alex Nayshtut, Gan Yavne D (IL); Denis Klimov, Be'er Sheva (IL)

(73) Assignee: INTEL CORPORATION, Santa Clara, CA (US)

( * ) Notice: Subject to any disclaimer, the term of this patent is extended or adjusted under 35 U.S.C. 154(b) by 311 days.

(21) Appl. No.: 16/361,515

(22) Filed: Mar. 22, 2019

(65) Prior Publication Data

US 2019/0220578 A1 Jul. 18, 2019

(51) Int. Cl.
*G06F 21/16* (2013.01)
*G06T 1/00* (2006.01)
*G06F 21/62* (2013.01)

(52) U.S. Cl.
CPC .......... *G06F 21/16* (2013.01); *G06F 21/6245* (2013.01); *G06T 1/0021* (2013.01); *G06F 2221/0733* (2013.01); *H04L 2209/608* (2013.01)

(58) Field of Classification Search
CPC .............. G06T 1/0021; H04N 21/8358; H04N 21/2352; H04N 21/23892; H04L 2201/3233; H04L 2209/608; G06F 21/10; G06F 21/16; G06F 21/6245; G06F 2221/0733
See application file for complete search history.

(56) References Cited

U.S. PATENT DOCUMENTS

| 9,716,599 B1* | 7/2017 | Gates | G06K 9/00302 |
|---|---|---|---|
| 10,853,800 B1* | 12/2020 | Meyer | G06Q 20/38215 |
| 2001/0034835 A1* | 10/2001 | Smith | H04L 9/3247 |
| | | | 713/175 |
| 2002/0168082 A1* | 11/2002 | Razdan | H04N 21/8358 |
| | | | 382/100 |
| 2013/0227293 A1* | 8/2013 | Leddy | H04N 21/845 |
| | | | 713/176 |
| 2015/0067882 A1* | 3/2015 | Serret-Avila | H04N 1/32144 |
| | | | 726/26 |
| 2015/0215492 A1* | 7/2015 | De Vuono | G06T 1/0042 |
| | | | 382/100 |
| 2016/0253772 A1* | 9/2016 | Kofod | G06T 1/0021 |
| | | | 382/100 |

\* cited by examiner

*Primary Examiner* — Linglan E Edwards
(74) *Attorney, Agent, or Firm* — Jaffery Watson Mendonsa & Hamilton LLP

(57) ABSTRACT

In one example an apparatus comprises a memory and a processor to receive, in an edge node of a secure network, a first file, determine that the first file is addressed to a recipient outside the secure network, and in response to a determination that the first file is addressed to a destination outside the secure network, to generate a watermark that identifies a transmitter of the document, a recipient of the document, and comprises a digital signature of the first file, embed the watermark in the first file to generate a watermarked file, and pass the watermarked file to an input/output system for transmission out of the secure network. Other examples may be described.

12 Claims, 7 Drawing Sheets

DYNAMIC DATA WATERMARKING FOR LEAKAGE SOURCE DETECTION

BACKGROUND

Subject matter described herein relates generally to the field of electronic devices and more particularly to dynamic data watermarking for leakage source detection.

Data leakage is an important cyber security risk for organizations. Disclosure of content that contains sensitive business or other organizational information can result in significant financial losses and/or reputational damage. Thus, organizations invest significant funds in integration of the data leakage prevention (DLP) systems and in their products. Unfortunately, many DLP tools are failed to cope with the situation when data is already leaked such as when organizational content is found outside of the DLP perimeter (e.g., published in WikiLeaks or other websites).

Accordingly, techniques to implement dynamic data watermarking for leakage source detection may find utility.

BRIEF DESCRIPTION OF THE DRAWINGS

The detailed description is described with reference to the accompanying figures.

DETAILED DESCRIPTION

Described herein are exemplary systems and methods to implement dynamic data watermarking for leakage source detection. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Figure 1:
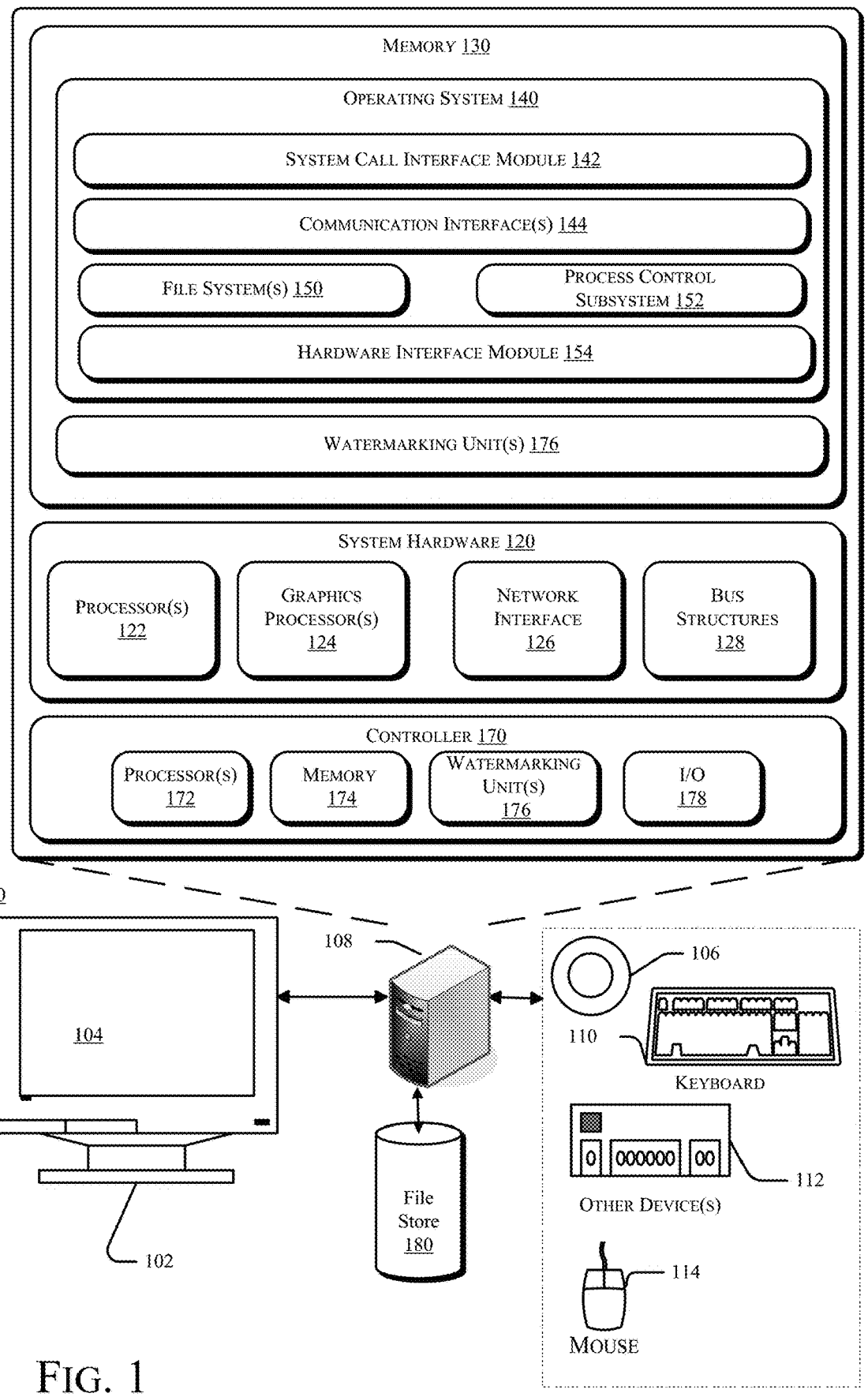
FIG. 1 is a schematic illustration of an exemplary electronic device which may be adapted to implement dynamic data watermarking for leakage source detection in accordance with some embodiments.

FIG. 1 is a schematic illustration of an exemplary system 100 which may be adapted to implement dynamic data watermarking for leakage source detection in accordance with some embodiments. In one embodiment, system 100 includes an electronic device 108 and one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, a geolocation device, an accelerometer/gyroscope and any other device that allows the system 100 to receive input from a user.

In various embodiments, the electronic device 108 may be embodied as a server, personal computer, a laptop computer, a personal digital assistant, a mobile telephone, an entertainment device, or another computing device. The electronic device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network such as a cloud storage network.

System hardware 120 may include one or more processors 122, graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated into the packaging of processor(s) 122, onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transmit and/or receive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In some embodiments system 100 may comprise an embedded processor, referred to herein as a controller 170. The controller 170 may be implemented as an independent integrated circuit located on the motherboard of the system 100. In the embodiment depicted in FIG. 1 the controller 170 comprises a processor 172, a memory module 174, a watermarking unit 176, and an I/O module 178. In some embodiments the memory 174 may comprise a persistent flash memory module and the watermarking unit 176 may be implemented as logic instructions encoded in the persistent memory module, e.g., firmware or software. In other examples the watermarking unit 176 may be reduced to hardwired circuitry. The I/O module 178 may comprise a serial I/O interface or a parallel I/O interface.

In some examples the controller 170 may be separated, either physically or logically, from the rest of the system hardware 120 and operating system 140 such that operations implemented on the controller 170 are not visible to the system hardware 120 or to processes which execute on the operating system 140. Because the controller 170 is separate from the main processor(s) 122 and operating system 140, the controller 170 may be made secure, i.e., resistant to attack by hackers such that it cannot be tampered with or otherwise altered.

Figure 2:
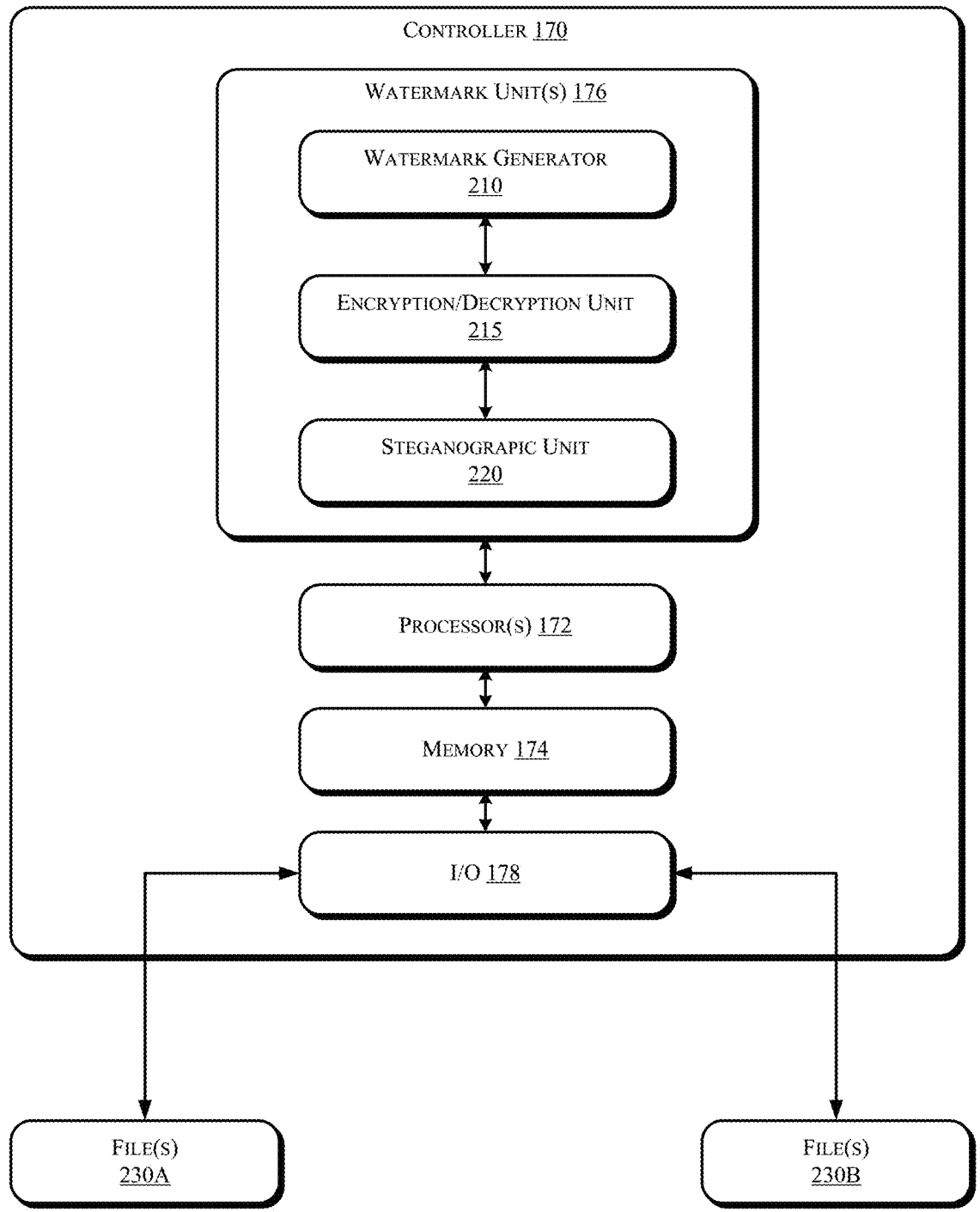
FIG. 2 is a schematic illustration of an exemplary apparatus which may be adapted to implement dynamic data watermarking for leakage source detection in accordance with some embodiments.

In some examples the watermarking unit(s) 176 interacts with one or more other components of the electronic device 100 to implement dynamic data watermarking for leakage source detection. FIG. 2 is a high-level schematic illustration of an exemplary architecture to implement a watermarking unit 176 in an electronic device. Referring to FIG. 2, watermarking unit 176 comprise a watermark generator 210, an encryption/decryption unit 215, and a steganographic unit 220. As described above, in some examples the watermark generator 210, an encryption/decryption unit 215, and steganographic unit 220 may be implemented as logic instructions executable on controller 170, e.g., as software or firmware, or may be reduced to hardwired logic circuits. Local memory 174 may be implemented using volatile and/or non-volatile memory.

As described above, I/O module 178 may comprise a serial I/O interface or a parallel I/O interface. I/O module 178 may be configured to receive one or more files 230A, 230B into the controller 170 and to send one or more files 230A, 230B from the controller 170.

Figure 3:
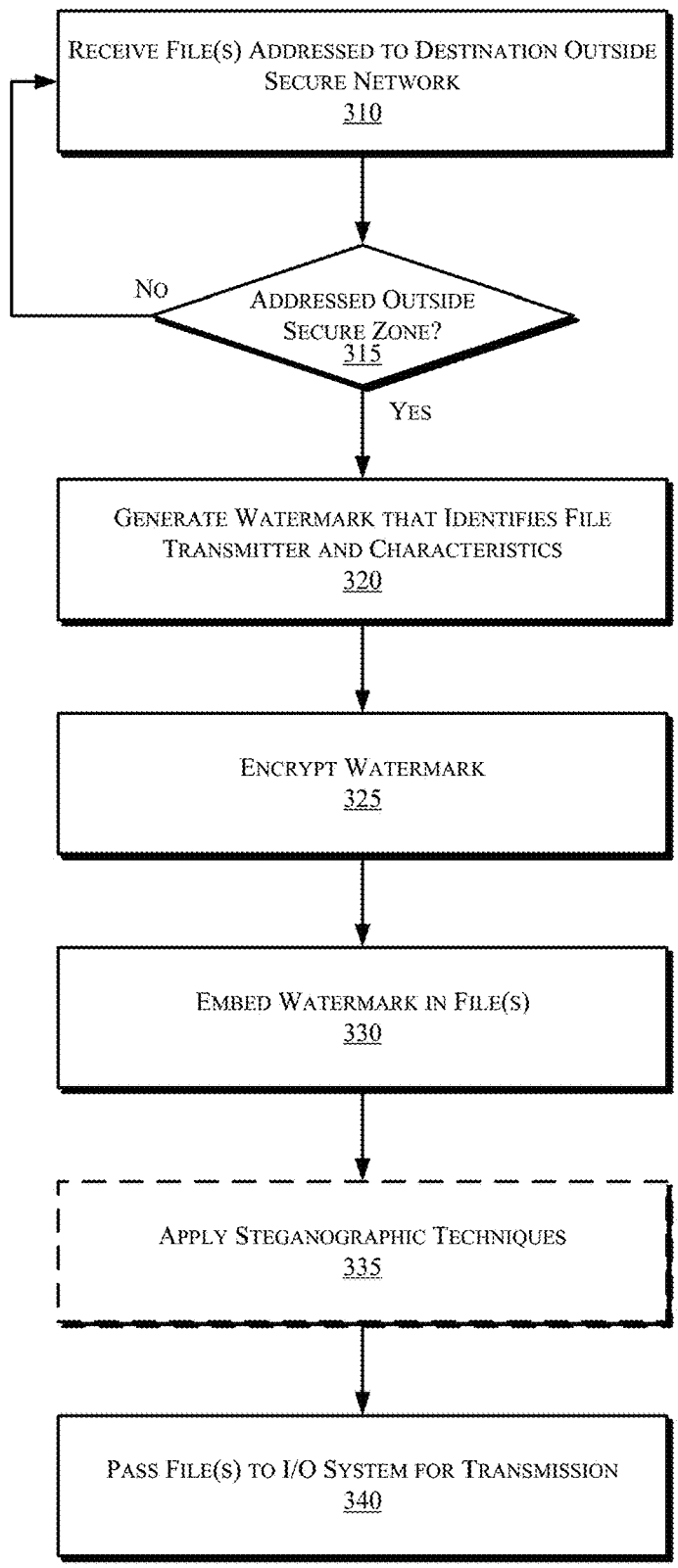
FIG. 3 is a flowchart illustrating operations in a method to implement dynamic data watermarking for leakage source detection in accordance with some embodiments.
Figure 4:
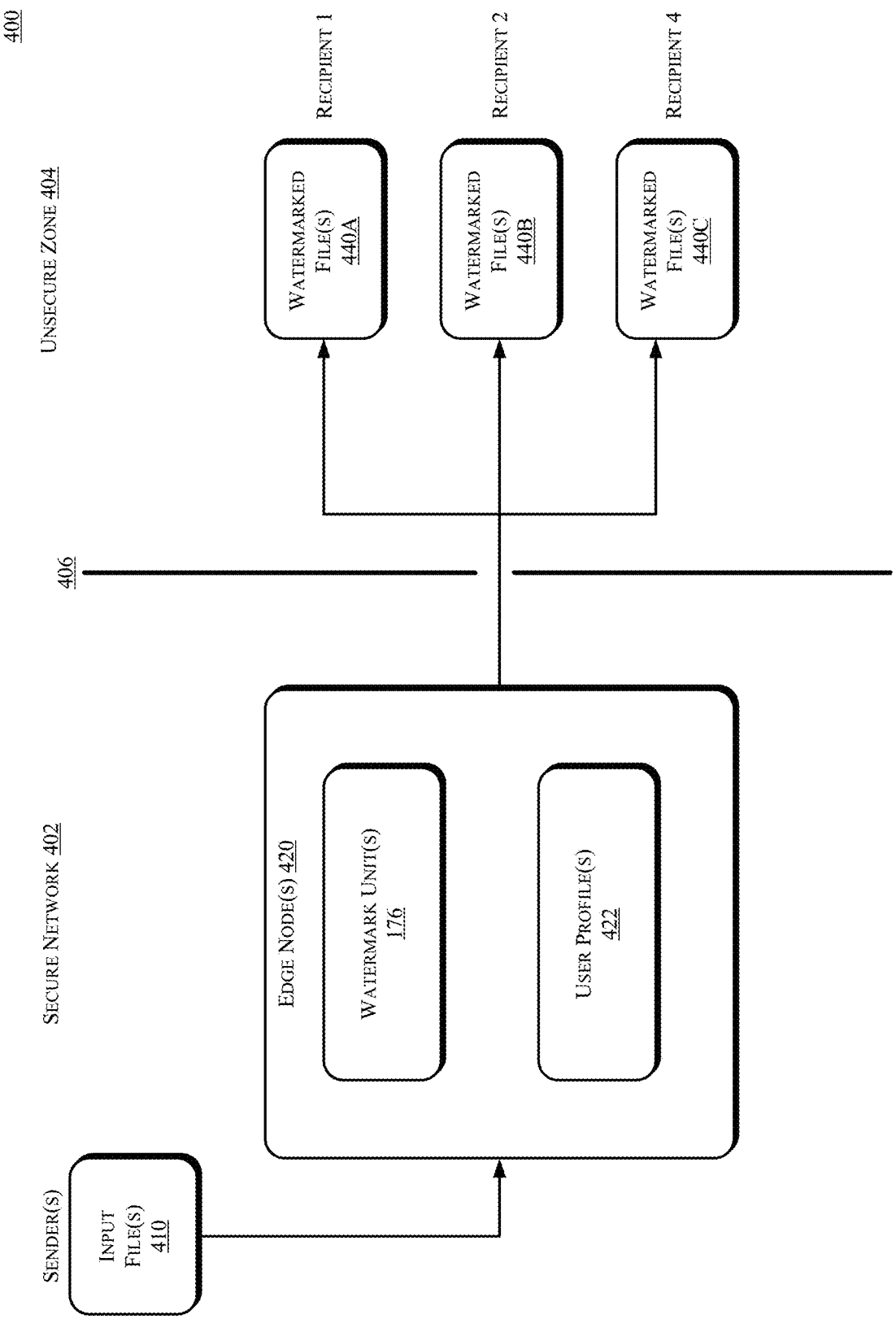
FIG. 4 is a schematic illustration of an operating environment which may be used to implement dynamic data watermarking for leakage source detection in accordance with some embodiments.

Having described various structures of a system to implement dynamic data watermarking for leakage source detection, operating aspects of a system will be explained with reference to FIGS. 3-6. FIG. 3 is a flowchart illustrating operations in a method to implement dynamic data watermarking for leakage source detection in accordance with some embodiments, and FIG. 4 is a schematic illustration of an operating environment which may be used to implement dynamic data watermarking for leakage source detection in accordance with some embodiments. In some embodiments the operations depicted in the flowchart of FIG. 3 may be implemented by the watermarking unit(s) 176 of the system 100, alone or in combination with other modules to apply a watermark to one or more files that are Referring to FIGS. 3-4, at operation 305 operation 310 the watermarking unit(s) 176 receive one or more files that are addressed to a destination that is outside a secure network. Referring to the environment depicted in FIG. 4, in one embodiment an environment 400 comprises a secure network 402 and an unsecure zone 404. For example, the secure network 402 may comprise a network owned or managed by an entity (e.g., a corporation or other organization) such that communication between nodes within the network are not readily accessible to nodes outside the secure network.

In some examples one or more edge nodes 420 may be implemented at the edge 406 between the secure network 402 and an unsecure zone 404. In some examples the edge node(s) 420 may comprise one or more servers such as an email server(s). In other examples the edge node(s) may comprise one or more internet access devices (e.g., a modem, router, or the like), or a voice over IP (VOIP) access device. The particular implementation of edge node(s) 420 is not critical. Edge node(s) 420 may comprise one or more watermark units 176, which may be implemented as described above. In some examples edge node(s) 420 may comprise one or more user profiles 422 for users of the secure network. In other examples the user profiles 422 may be stored in a separate node in secure network 402 that is communicatively coupled to edge node(s) 422.

In some examples at operation 305 the edge node 420 may receive one or more input files from a sender inside the secure network 402 that is being transmitted from the sender to one or more recipients in an unsecure zone 404 that is outside the secure network. For example, the input file may comprise one or more emails including one or more files attached to the email. Alternatively, the input file(s) may comprise one or more files uploaded to a website or transmitted to one or more recipients via a VOIP service or a chat service. The particular mechanism by which the input file(s) are to be transmitted outside the secured network 402 is not critical.

At operation 315 the watermarking unit(s) 176 determine whether the input file(s) 410 are addressed to a recipient that is outside the secure network 402. If, at operation 315, the input file(s) 410 are not addressed to a recipient that is outside the secure network then control passes back to operation 310 and the watermarking unit(s) 176 receive additional files from one or more senders. By contrast, if at operation 315 the input file(s) 410 are addressed to a recipient that is outside the secure network then control passes to operation 320.

At operation 320 the watermarking unit(s) 176 generate one or more watermarks for the file(s) received in operation 310. In some examples the watermarking unit(s) 176 generate a unique watermark for each file received in operation 310 and for each recipient that receives a copy of the file. Each watermark comprises information that uniquely identifies the sender of the file(s), the sender's account information, a timestamp that identifies when the file(s) were sent, and one or more network settings for the secure network 402. Additionally, the watermark comprises information that uniquely identifies each recipient of the file(s), the recipient's account information, a timestamp that identifies when the file(s) were delivered, and one or more network settings for the recipient's network in the unsecure zone 404.

In some examples the watermark includes a digital signature that is applied to the content of the file(s) received in operation 310. The digital signature may be implemented using an RSA algorithm or other suitable cryptographic algorithm One example of a structure for a watermark is given below in Table 1.

TABLE 1

Watermark Structure

| Item | Description | What for |
|---|---|---|
| Senders ID | Full Name or User's UUID in organization | Reliably associate sender with content |
| Senders Account | Mail, skype, etc. address the content is sent from | Reliably associate sender with delivery channel |
| Sent Date & Time | Date and time when content was sent | Support log investigation & traffic analysis |
| Source Network Settings | Network settings (IP, MAC, etc.) reliably identifying sender's machine | Support non-repudiation and forensics |
| Recipient ID | Full Name or User's UUID in organization | Reliably associate recipient with content |
| Recipient Account | Mail, skype, etc. address the content is sent to | Reliably associate recipient with delivery channel |
| Delivered Date & Time | Date and time when content was delivered | Support log investigation & traffic analysis |
| Destination Network Settings | Network settings (IP, MAC, etc.) reliably identifying receiver's machine | Support non-repudiation and forensics |
| Content CRC/SHA | CRC/SHA (e.g. SHA1) of the watermarked content | To support reliable association of the above with given content. |
| Signature | Signature (using owner private key) | Proof of watermark authenticity |

Referring back to FIG. 3, at operation 325 the watermark generated in operation 320 is encrypted to preserve information and protect the watermark from modifications. At operation 330 the watermark is embedded into the file received in operation 310. In some examples, optionally at operation 335, the watermark may be embedded in the file using one or more steganographic techniques to hide the watermark in the file. The particular steganographic technique is not critical. For example, if the file is a text file then a form of linguistic and/or semantic steganography may be implemented. If the file is an image file then some form of color modulation-based and/or pixel placement-based steganographic technique may be implemented. If the file is a video file then some form of steganography based on quantization scale modulation, BCH coding, flipping compression and modulation settings, or flipping frequencies may be implemented. If the file is an audio file then some form of steganography based on LSB Coding, parity coding, phase coding, spread spectrum, and/or echo hiding may be implemented.

Once the watermark has been embedded into the file received in operation 310 the file may be passed (operation 340) to an input/output system to be sent to a destination in the unsecure zone 404 outside the secure network. In some examples operations 310 to 340 are performed for each file and for each recipient outside of secure network 402. For example, an email that is directed to three separate recipients would generate three separate watermarked files 440A, 440B, and 440C. Similarly, each file attached to the email would generate three separate watermarked files.

Figure 5:
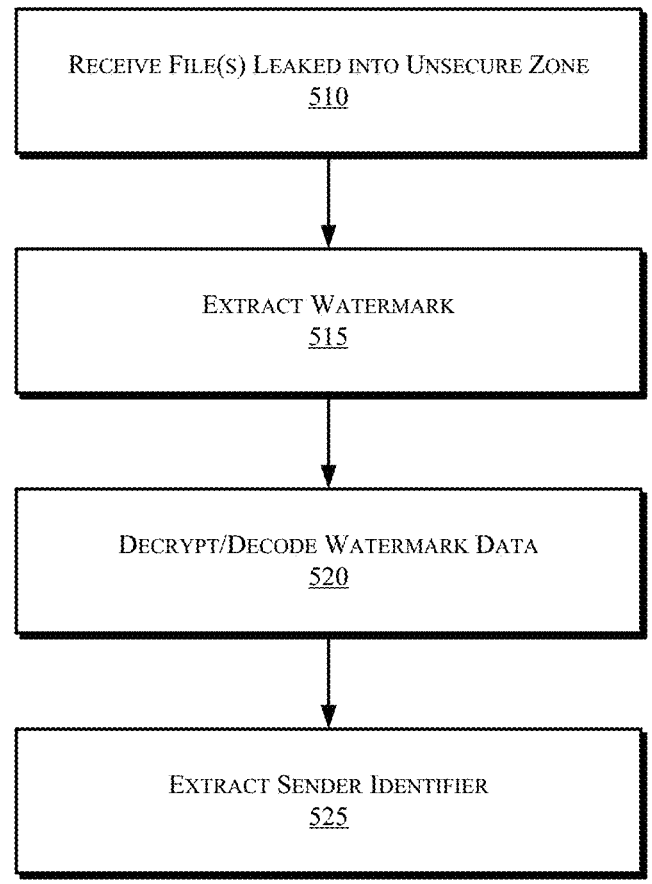
FIG. 5 is a flowchart illustrating operations in a method to implement dynamic data watermarking for leakage source detection in accordance with some embodiments.
Figure 6:
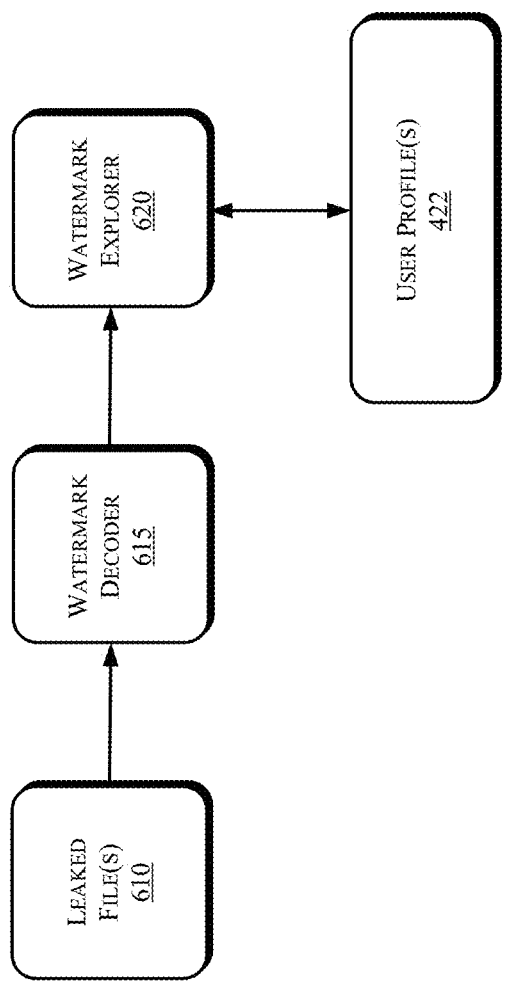
FIG. 6 is a schematic illustration of an operating environment which may be used to implement dynamic data watermarking for leakage source detection in accordance with some embodiments.

When a leaked file is located in the unsecured zone 404 a process may be implemented to use the watermark to identify both the sender and the recipient(s) of the leaked file. Referring to FIGS. 5-6, at operation 510 a file that may have been leaked into the unsecure zone 404 is received. For example, the file may be recovered during a review for secure files or may be reported as a leaked document. Referring to FIG. 6, the leaked file 610 is input to a watermark decoder 615 which, at operation 515 extracts the watermark from the file.

At operation 520 the watermark decoder 615 decrypts and decodes the watermark, and at operation 525 the watermark decoder extracts the sender information from the watermark. The sender information may be used by a watermark explorer 620 to cross-reference against the user profile(s) 422 used to generate the watermark. If a match is found in the user profile(s) 422 then the sender of the leaked file(s) has been determined and appropriate action may be taken. By way of example, appropriate action may include flagging and/or suspending account access privileges for the sender of the leaked files(s).

Figure 7:
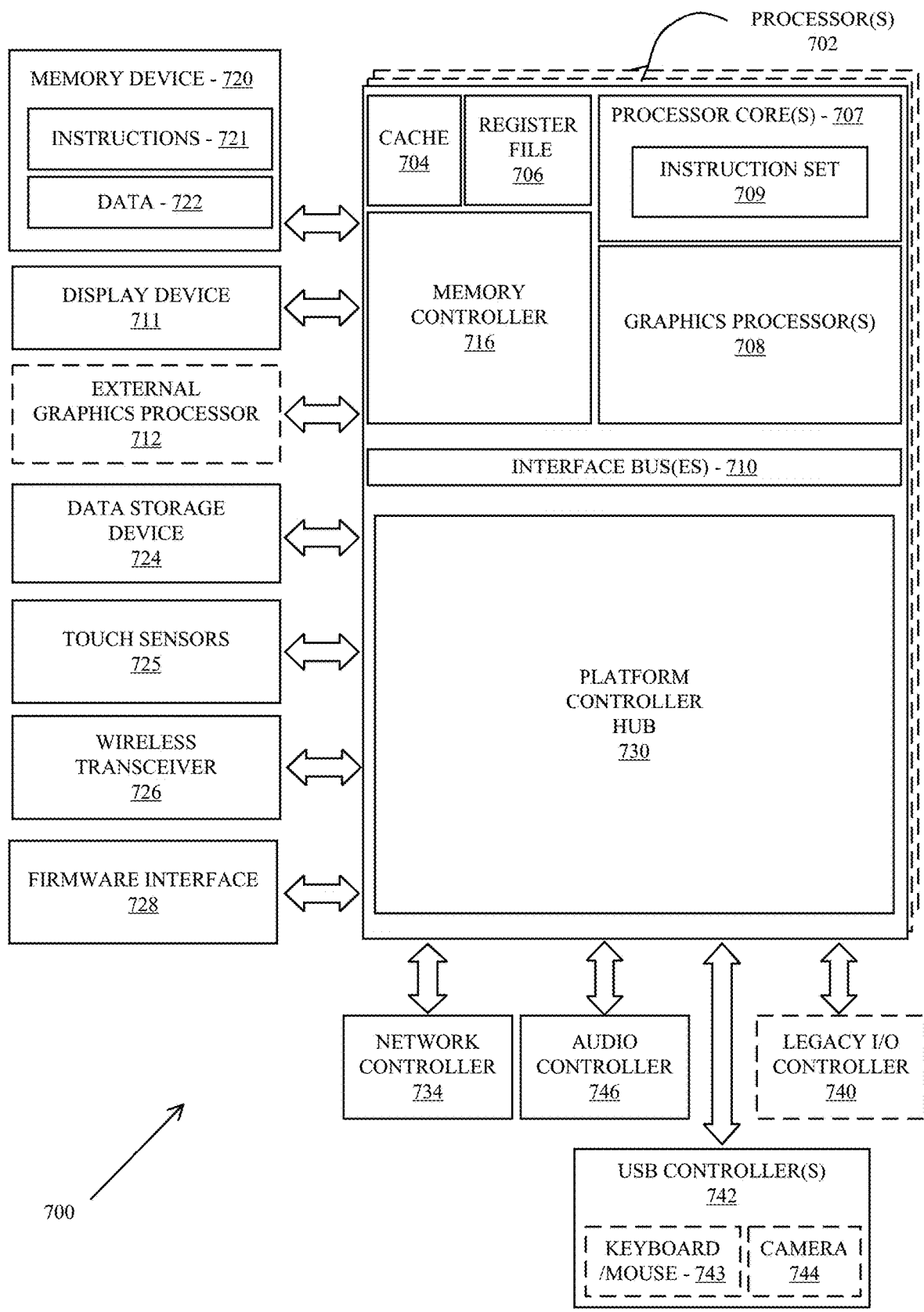
FIG. 7 is a schematic illustration of a computing architecture which may be adapted to implement adversarial training of neural networks using information about activation path differentials in accordance with some examples.

FIG. 7 illustrates an embodiment of an exemplary computing architecture that may be suitable for implementing various embodiments as previously described. In various embodiments, the computing architecture 700 may comprise or be implemented as part of an electronic device. In some embodiments, the computing architecture 700 may be representative, for example of a computer system that implements one or more components of the operating environments described above. In some embodiments, computing architecture 700 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, or Long Term Evolution (LTE) transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

The following pertains to further examples.

Example 1 is an apparatus, comprising a memory and a processor to receive, in an edge node of a secure network, a first file, determine that the first file is addressed to a recipient outside the secure network, and in response to a determination that the first file is addressed to a destination outside the secure network, to generate a watermark that identifies a transmitter of the document, a recipient of the document, and comprises a digital signature of the first file, embed the watermark in the first file to generate a watermarked file, and pass the watermarked file to an input/output system for transmission out of the secure network.

In Example 2, the subject matter of Example 1 can optionally include a processor to encrypt the watermark.

In Example 3, the subject matter of any one of Examples 1-2 can optionally include a processor to apply one or more steganographic techniques to conceal the watermark in the file.

In Example 4, the subject matter of any one of Examples 1-3 can optionally include a processor to store the watermark in a memory in the secure network.

In Example 5, the subject matter of any one of Examples 1-4 can optionally include an arrangement wherein the watermark comprises a sender identifier; a sender account identifier; a sender timestamp; one or more source network settings; a recipient identifier; a recipient account identifier; a recipient timestamp; and one or more destination network settings.

In Example 6, the subject matter of any one of Examples 1-5 can optionally include a processor to receive the watermarked file, extract the watermark from the watermark file, and decode the watermark.

In Example 7, the subject matter of any one of Examples 1-6 can optionally include a processor to extract the sender identifier from the watermark.

Example 8 is a non-transitory computer-readable medium comprising instructions which, when executed by a processor, configure the processor to receive, in an edge node of a secure network, a first file; determine that the first file is addressed to a recipient outside the secure network, and in response to a determination that the first file is addressed to a destination outside the secure network, to generate a watermark that identifies a transmitter of the document, a recipient of the document, and comprises a digital signature of the first file; embed the watermark in the first file to generate a watermarked file; and pass the watermarked file to an input/output system for transmission out of the secure network.

In Example 9, the subject matter of Example 8 can optionally include instructions to configure the processor to encrypt the watermark.

In Example 10, the subject matter of any one of Examples 8-9 can optionally include instructions to configure the processor to apply one or more steganographic techniques to conceal the watermark in the file.

In Example 11, the subject matter of any one of Examples 8-10 can optionally include instructions to configure the processor to store the watermark in a memory in the secure network.

In Example 12, the subject matter of any one of Examples 8-11 can optionally include an arrangement wherein the watermark comprises a sender identifier; a sender account identifier; a sender timestamp; one or more source network settings; a recipient identifier; a recipient account identifier; a recipient timestamp; and one or more destination network settings.

In Example 13, the subject matter of any one of Examples 8-12 can optionally include instructions to configure the processor to receive the watermarked file, extract the watermark from the watermark file, and decode the watermark.

In Example 14, the subject matter of any one of Examples 8-13 can optionally include instructions to configure the processor to extract the sender identifier from the watermark.

Example 15 is a computer-implemented method, comprising receiving, in an edge node of a secure network, a first file; determining that the first file is addressed to a recipient outside the secure network, and in response to a determination that the first file is addressed to a destination outside the secure network, generating a watermark that identifies a transmitter of the document, a recipient of the document, and comprises a digital signature of the first file; embedding the watermark in the first file to generate a watermarked file; and passing the watermarked file to an input/output system for transmission out of the secure network In Example 16, the subject matter of Example 15 can optionally include encrypting the watermark.

In Example 17, the subject matter of any one of Examples 15-16 can optionally include applying one or more steganographic techniques to conceal the watermark in the file.

In Example 18, the subject matter of any one of Examples 15-17 can optionally include storing the watermark in a memory in the secure network.

In Example 19, the subject matter of any one of Examples 15-18 can optionally include an arrangement wherein the watermark comprises a sender identifier; a sender account identifier; a sender timestamp; one or more source network settings; a recipient identifier; a recipient account identifier; a recipient timestamp; and one or more destination network settings.

In Example 20, the subject matter of any one of Examples 15-19 can optionally include receiving the watermarked file, extracting the watermark from the watermark file, and decoding the watermark.

In Example 21, the subject matter of any one of Examples 15-203 can optionally include extracting the sender identifier from the watermark.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a memory; and
a processor to:
receive, in an edge node of a secure network, a first file;
determine that the first file is addressed to a recipient outside the secure network, and in response to a determination that the first file is addressed to a destination outside the secure network, to:
generate a watermark that identifies a transmitter of the first file, a recipient of the first file, and comprises a digital signature of the first file, wherein the watermark comprises:
a sender identifier;
a sender account identifier;
a sender timestamp;
one or more source network settings;
a recipient identifier;
a recipient account identifier;
a recipient timestamp; and
one or more destination network settings;
embed the watermark in the first file to generate a watermarked file;
pass the watermarked file to an input/output system for transmission out of the secure network;
apply one or more steganographic techniques to conceal the watermark in the watermarked file; and
store the watermark in a memory in the secure network.

2. The apparatus of claim 1, the processor to:
encrypt the watermark.

3. The apparatus of claim 1, the processor to:
receive the watermarked file;
extract the watermark from the watermark file; and
decode the watermark.

4. The apparatus of claim 3, the processor to:
extract the sender identifier from the watermark.

5. A non-transitory computer-readable medium comprising instructions which, when executed by a processor, configure the processor to:
receive, in an edge node of a secure network, a first file;
determine that the first file is addressed to a recipient outside the secure network, and in response to a determination that the first file is addressed to a destination outside the secure network, to:
generate a watermark that identifies a transmitter of the first file, a recipient of the first file, and comprises a digital signature of the first file, wherein the watermark comprises:
a sender identifier;
a sender account identifier;
a sender timestamp;
one or more source network settings;
a recipient identifier;
a recipient account identifier;
a recipient timestamp; and
one or more destination network settings;
embed the watermark in the first file to generate a watermarked file; and
pass the watermarked file to an input/output system for transmission out of the secure network;
apply one or more steganographic techniques to conceal the watermark in the watermarked file; and store the watermark in a memory in the secure network.

6. The non-transitory computer-readable medium of claim 5, further comprising instructions which, when executed by the processor, configure the processor to:
encrypt the watermark.

7. The non-transitory computer-readable medium of claim 5, further comprising instructions which, when executed by the processor, configure the processor to:
receive the watermarked file;
extract the watermark from the watermark file; and
decode the watermark.

8. The non-transitory computer-readable medium of claim 7, further comprising instructions which, when executed by the processor, configure the processor to:
extract the sender identifier from the watermark.

9. A computer-implemented method, comprising:
receiving, in an edge node of a secure network, a first file;
determining that the first file is addressed to a recipient outside the secure network, and in response to a determination that the first file is addressed to a destination outside the secure network:
generating a watermark that identifies a transmitter of the first file, a recipient of the first file, and comprises a digital signature of the first file, wherein the watermark comprises:
a sender identifier;
a sender account identifier;
a sender timestamp;
one or more source network settings;
a recipient identifier;
a recipient account identifier;
a recipient timestamp; and
one or more destination network settings;
embedding the watermark in the first file to generate a watermarked file; and
passing the watermarked file to an input/output system for transmission out of the secure network;
apply one or more steganographic techniques to conceal the watermark in the watermarked file; and
store the watermark in a memory in the secure network.

10. The computer-implemented method of claim 9, further comprising:
encrypting the watermark.

11. The computer-implemented method of claim 9, further comprising:
receiving the watermarked file;
extracting the watermark from the watermark file; and
decoding the watermark.

12. The computer-implemented method of claim 11, further comprising:
extracting the sender identifier from the watermark.

* * * * *